(12) United States Patent
Ichihara et al.

(10) Patent No.: US 7,195,110 B2
(45) Date of Patent: *Mar. 27, 2007

(54) ONE-WAY CLUTCH UNIT

(75) Inventors: Takahiro Ichihara, Kashiwara (JP); Hajime Watanabe, Kashiwara (JP); Hideki Fujiwara, Nara (JP); Minoru Mera, Kariya (JP); Taku Adaniya, Kariya (JP); Akinobu Kanai, Kariya (JP); Naoki Usui, Kariya (JP); Tomoharu Arai, Kariya (JP)

(73) Assignees: Koyo Seiko Co., Ltd., Osaka (JP); Kabushiki Kaisha Toyota Jidoshokki, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/786,472

(22) Filed: Feb. 26, 2004

(65) Prior Publication Data
US 2004/0178040 A1    Sep. 16, 2004

(30) Foreign Application Priority Data
Feb. 28, 2003    (JP)    ............................. 2003-053769

(51) Int. Cl.
F16D 41/06    (2006.01)

(52) U.S. Cl. ................................. 192/48.92; 192/110 B

(58) Field of Classification Search ............. 192/48.92; 74/661; 62/236, 323.4; 417/16
See application file for complete search history.

(56) References Cited

U.S. PATENT DOCUMENTS 7,007,781 B2 * 3/2006 Ichihara et al. .......... 192/48.92
2002/0157413 A1 10/2002 Iwanami et al.
2002/0183147 A1 * 12/2002 Fujiwara ........................ 474/70
2003/0000792 A1 * 1/2003 Fujiwara ........................ 192/45
2003/0085091 A1 * 5/2003 Ichihara et al. ................ 192/45
2003/0098216 A1 * 5/2003 Hayashi .................... 192/48.92
2003/0098624 A1 * 5/2003 Iwasa et al. ................. 310/112
2003/0103848 A1 * 6/2003 Hayashi ....................... 417/212
2003/0126870 A1 7/2003 Meckstroth et al.
2003/0194263 A1 * 10/2003 Ueda et al. ..................... 403/2
2003/0200759 A1 10/2003 Iwanami et al.
2004/0026201 A1 * 2/2004 Imasaka et al. ............. 192/3.28

FOREIGN PATENT DOCUMENTS

| DE | 102 18 083 A1 | 11/2002 |
| DE | 103 17 522 A1 | 11/2003 |
| JP | 2001140757 | 5/2001 |
| JP | 2003-166469 A * | 6/2003 |

OTHER PUBLICATIONS

EP Search Report mailed May 12, 2004 in corresponding EP application No. 04004496.8-2423.

* cited by examiner

Primary Examiner—Rodney H. Bonck
(74) Attorney, Agent, or Firm—Nixon & Vanderhye P.C.

(57) ABSTRACT

There is provided a one-way clutch unit that is simple in structure and compact. An annular recess 67 is provided in an inner periphery of a side of a deep groove ball bearing portion 55 of a first inner ring 7 of a first one-way clutch 1, and an end portion on the side of a deep groove ball bearing portion 65 of a second one-way clutch 2 is disposed in the annular recess 67. Thereby, the dimension in an axial direction of the one-way clutch unit is reduced by a dimension in the axial direction of the second one-way clutch 2 that is disposed in the annular recess 67.

10 Claims, 2 Drawing Sheets

Title: ONE-WAY CLUTCH UNIT

BACKGROUND OF THE INVENTION

The present invention relates to a one-way clutch unit which is convenient if used for connection and disconnection of power between, for example, an automobile engine and an air conditioner.

Conventionally, as a power transmission device used for connection and disconnection of power between an automobile engine and an air conditioner, there is a device in which an electromagnetic clutch is provided between a pulley and a rotating shaft that drives a compressor. The electromagnetic clutch is turned on while the engine is rotating so that a rotational power is transmitted to the rotating shaft from the pulley. On the other hand, the electromagnetic clutch is turned off when the engine is stopped to disconnect the rotating shaft from the pulley, so that the rotating shaft is driven to rotate by a motor.

However, the conventional power transmission device requires an electromagnetic clutch and a control part that controls on-off action of the electromagnetic clutch. This makes the structure of the power transmission device complicated and increases the device size.

SUMMARY OF THE INVENTION

It is an object of the present invention to provide a one-way clutch unit that allows a power transmission device to be simple in structure and small in size.

In order to achieve the above object, a one-way clutch unit of the present invention comprises:

a first one-way clutch including a first outer ring having in an inner periphery thereof an engagement surface and a raceway surface which are adjacent to each other, a first inner ring having in an outer periphery thereof an engagement surface and a raceway surface which are adjacent to each other, first engagement members disposed between the engagement surface of the first outer ring and the engagement surface of the first inner ring, and first balls disposed between the raceway surface of the first outer ring and the raceway surface of the first inner ring; and a second one-way clutch including a second outer ring having in an inner periphery thereof an engagement surface and a raceway surface which are adjacent to each other, a second inner ring having in an outer periphery thereof an engagement surface and a raceway surface which are adjacent to each other, second engagement members disposed between the engagement surface of the second outer ring and the engagement surface of the second inner ring, and second balls disposed between the raceway surface of the second outer ring and the raceway surface of the second inner ring; wherein an annular recess is provided in the inner periphery of the first inner ring of the first one-way clutch; and wherein one end portion of the second one-way clutch is disposed in the annular recess.

In the one-way clutch unit of the present invention, for example, suppose that the first outer ring of the first one-way clutch is connected to a pulley driven by an engine, that the second outer ring of the second one-way clutch is connected to a rotor of a motor, and that the first inner ring of the first one-way clutch and the second inner ring of the second one-way clutch are connected to a rotating shaft of the compressor. Then, while the engine is operating, a rotational power of the pulley driven by the engine is transmitted to the rotating shaft of the compressor via the first outer ring, first engagement members and first inner ring of the first one-way clutch, so that the rotating shaft of the compressor is rotated by the engine. During the operation of the engine, the second one-way clutch is in a disengaged state, and the second inner ring of the second one-way clutch freely rotates. On the other hand, while the engine is not operating, the motor is driven so that the rotational power of the rotor of the motor is transmitted to the rotating shaft of the compressor via the second outer ring, second engagement members and second inner ring of the second one-way clutch, whereby the rotating shaft of the compressor is rotated by the motor. While the engine is not operating, the first one-way clutch is in a disengaged state, and the first inner ring freely rotates or idles.

With the use of the one-way clutch unit of the invention, the rotating shaft of the compressor can be driven by the engine and the motor without any need for an electromagnetic clutch or a control part therefor, thus enabling the power transmission device to be simple in structure and compact.

According to the one-way clutch unit of the present invention, the annular recess is formed in the inner periphery of the first inner ring of the first one-way clutch, and the one end portion of the second one-way clutch is disposed in the annular recess. Thus, the dimension in an axial direction of the overall one-way clutch unit can be reduced by a dimension in the axial direction of the one end portion of the second one-way clutch disposed in the annular recess. Therefore, the one-way clutch unit can be made compact.

In one embodiment, the annular recess is provided in the inner periphery of a side of the raceway surface of the first inner ring of the first one-way clutch.

In general, in a state in which the annular recess is not formed, the thickness on the side of the raceway surface of the first inner ring is larger than that on the side of the engagement surface of the first inner ring. Thus, even if the annular recess is formed on the side of the raceway surface of the first inner ring, the thickness on the side of the raceway surface of the first inner ring can be kept to an extent that structural strength of the first one-way clutch is not weakened. Accordingly, deterioration of the structural strength of the first one-way clutch and the one-way clutch unit, in particular deterioration of the strength thereof against radial loads can be suppressed.

In one embodiment, in the first one-way clutch, the first engagement members are engagement rollers, the engagement surface of the first outer ring is an engagement cylindrical surface, and the engagement surface of the first inner ring is an engagement cam-surface.

According to the above embodiment, the first engagement members are the first engagement rollers, the engagement surface of the first outer ring is the engagement cylindrical surface, and the engagement surface of the first inner ring is the engagement cam-surface. Thus, a diameter of a shoulder portion of the raceway surface of the first inner ring is generally larger than the maximum outer diameter of the engagement cam-surface of the first inner ring, because of the structure of the first one-way clutch. Thereore, even if the annular recess is formed in the inner periphery of the side of the raceway surface of the first inner ring, a sufficient thickness on the side of the raceway surface of the first inner ring can be secured, so that the strength, against radial loads, of the one-way clutch unit and the first one-way clutch does not deteriorate.

In one embodiment, an end portion on the side of the raceway surface of the second one-way clutch is disposed in the annular recess.

According to the above embodiment, the end portion on the side of the raceway surface of the second one-way clutch is disposed in the annular recess of inner periphery of the first inner ring of the first one-way clutch. In general, the thickness on the side of the raceway surface of the second outer ring is larger than that on the side of the engagement surface of the second outer ring. Thus, even if the thickness on the side of the raceway surface of the second outer ring is set in such a manner that the end portion on the side of the raceway surface of the second outer ring is disposed in the annular recess of the inner periphery of the first inner ring of the first one-way clutch, the thickness of the second outer ring of the second one-way clutch can be kept to an extent that the structural strength of the second one-way clutch is not weakened. Therefore, deterioration of the strength against radial loads at a raceway portion of each of the first one-way clutch and the second one-way clutch in the one-way clutch unit can be suppressed.

In one embodiment, in the second one-way clutch, the second engagement members are engagement rollers, the engagement surface of the second outer ring is an engagement cam-surface, and the engagement surface of the second inner ring is an engagement cylindrical surface.

According to the above embodiment, the second engagement members of the second one-way clutch are the engagement rollers, the engagement surface of the second outer ring is the engagement cam-surface, and the engagement surface of the second inner ring is the engagement cylindrical surface. Therefore, because of the structure of the second outer ring, the diameter of the shoulder portion of the raceway surface of the second outer ring is generally smaller than he minimum inner diameter of the engagement cam-surface of the second outer ring. Thus, even if the thickness in a radial direction on the side of the raceway surface of the second one-way clutch is set in such a manner that the end portion of the second one-way clutch is disposed in the annular recess of the inner periphery of the first inner ring of the first one-way clutch, a sufficient thickness in the radial direction of the raceway portion of each of the first one-way clutch and the second one-way clutch in the one-way clutch unit can be secured, so that the strength, against radial loads, of the first one-way clutch and the second one-way clutch does not deteriorate.

In one embodiment, a curved surface connects an end surface and a peripheral surface in the annular recess of the first inner ring; and wherein a curved surface connects an end surface and an outer peripheral surface in an end portion of the second outer ring which is disposed in the annular recess of the first inner ring.

According to the above embodiment, the curved surface provides the connection between the end surface and the peripheral surface in the annular recess of the first inner ring, and the curved surface provides the connection between the end surface and the outer peripheral surface in the end portion of the second outer ring which is disposed in the annular recess of the first inner ring. Thus, even if the second one-way clutch is disposed in the annular recess of the inner periphery of the first inner ring of the first one-way clutch so that an end surface of the end portion of the second one-way clutch is brought into contact with an end surface of a concave surface of the first inner ring of the first one-way clutch, stress is not concentrated on a connecting portion between the end surface and the peripheral surface in the recess of the first inner ring, and a connecting portion between the end surface and the outer peripheral surface in the end portion of the second outer ring. Accordingly, breakage of these connecting portions can be prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will hereinafter be described in more detail by an embodiment illustrated.

Figure 1:
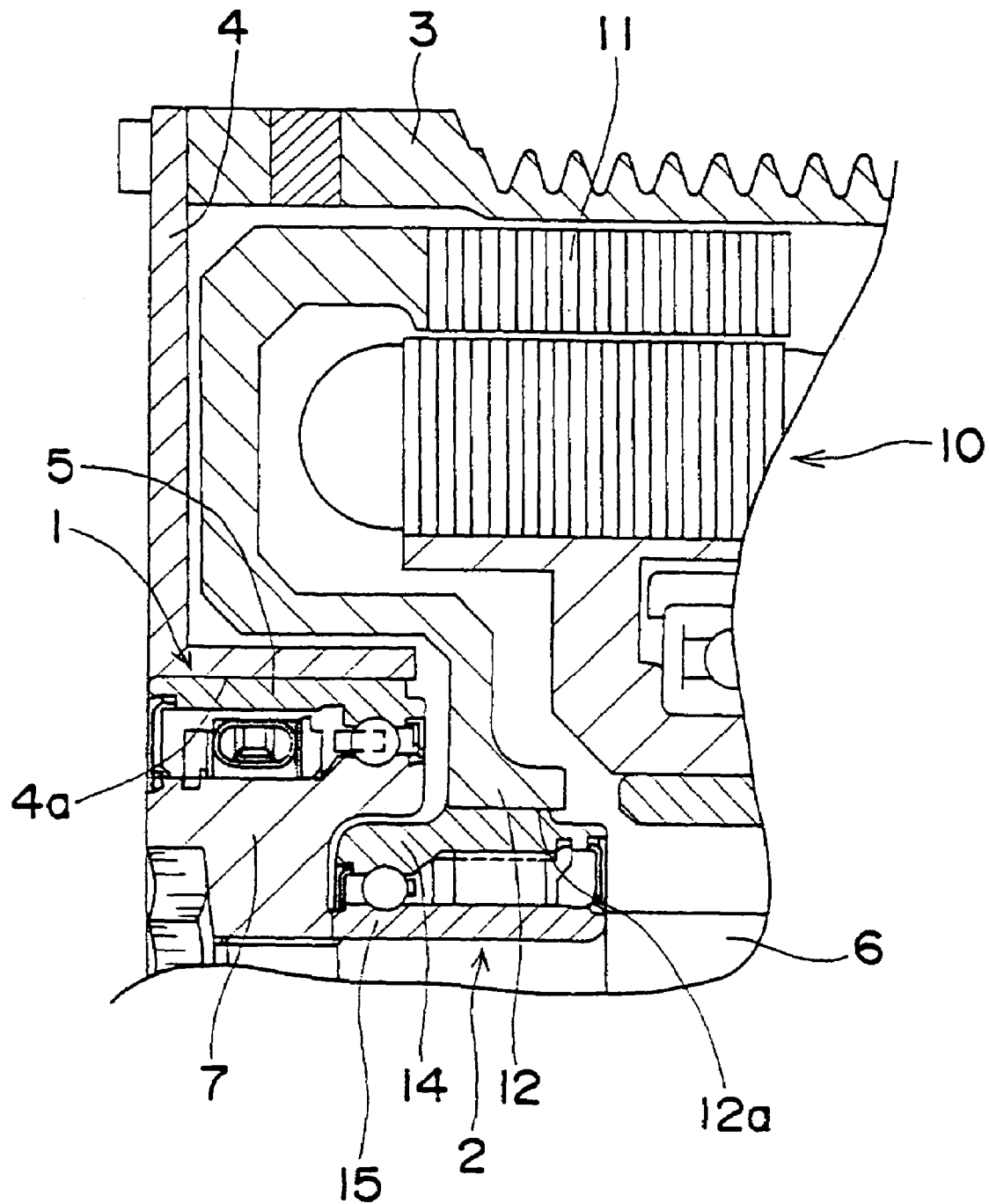
FIG. 1 is a cross section of a power transmission device including one embodiment of a one-way clutch unit of the present invention.

FIG. 1 is a cross section of a power transmission device including one embodiment of a one-way clutch unit of the invention.

The one-way clutch unit is comprised of a first one-way clutch 1 and a second one-way clutch 2.

While an engine not shown is in operation, a rotational power of a pulley 3 driven by this engine is transmitted to a rotating shaft 6 of a compressor not shown via a first power transmission member 4 and the first one-way clutch 1. On the other hand, when the engine is stopped, a rotational power of a rotor 11 of a motor 10 is transmitted to the rotating shaft 6 of the compressor via the second one-way clutch 2. In FIG. 1, reference numeral 12 indicates a yoke of the rotor 11, reference numeral 4a indicates a connecting surface of the first power transmission member 4 to the first one-way clutch 1, and reference numeral 12a indicates a connecting surface of the yoke 12 of the rotor 11 to the second one-way clutch 2.

Figure 2:
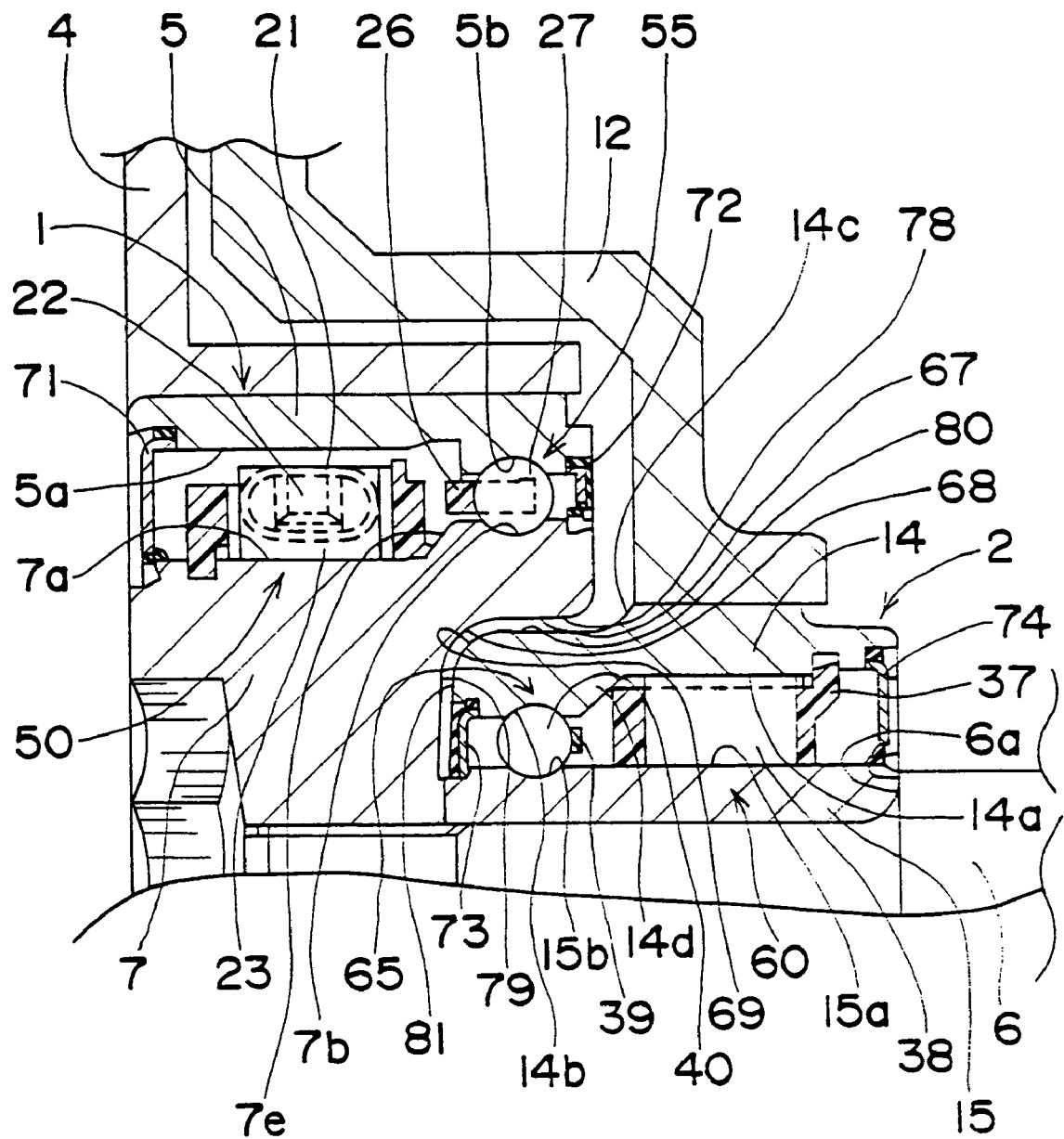
FIG. 2 is an enlarged view of part of the one-way clutch unit of FIG. 1.

As shown in FIG. 2, the first one-way clutch 1 includes a first outer ring 5 fixed to the first power transmission member 4, a first inner ring 7 fixed to the rotating shaft 6, first engagement rollers 23 as an example of first engagement members, retainer 22 and coil springs 21. A plurality of the engagement rollers 23 retained by the retainer 22 are circumferentially disposed at predetermined intervals between an engagement cylindrical surface 5a as an example of an engagement surface, which is formed on an inner periphery of the first outer ring 5, and an engagement cam-surface 7a as an example of an engagement surface, which is formed on an outer periphery of the first inner ring 7, so that the engagement rollers 23 are urged in one direction by the coil springs 21.

The engagement cylindrical surface 5a of the first outer ring 5, the engagement cam-surface 7a of the first inner ring 7, the coil springs 21, the retainer 22 and the engagement rollers 23 compose a one-way clutch portion 50 of the first one-way clutch 1.

The first one-way clutch 1 includes first balls 27 as an example of first rolling members and a retainer 26. The first balls 27 retained by the retainer 26 are circumferentially disposed at predetermined intervals between a raceway surface 5b with a circular arc shape in section, which is formed adjacent the engagement cylindrical surface 5a of the first outer ring 5 and a raceway surface 7b with a circular arc shape in cross section, which is formed adjacent the engagement cam-surface 7a of the first inner ring 7. The raceway surface 5b of the first outer ring 5, the raceway surface 7b of the first inner ring 7, the retainer 26 and the first balls 27 form a deep groove ball bearing portion 55.

In the first one-way clutch, an axially opened annular recess 67 is formed at an inner periphery in an end portion of the side of the raceway surface of the first inner ring 7 of the first one-way clutch 1. A curved surface 68 provides a connection between an end surface 79 in the axial direction of the annular recess 67 and a peripheral surface 78 thereof.

The maximum outer diameter of the engagement cam-surface 7a of the first inner ring 7 is smaller than a diameter of shoulder portions of the raceway surface 7b of the first inner ring 7, and a tapered surface 7e is present on the side of the deep groove ball bearing portion 55 of the first inner ring 7 of the first one-way clutch 1, forming a side surface of the shoulder portion.

On the other hand, the second one-way clutch 2 includes a second outer ring 14 fixed to the yoke 12 of the rotor 11, a second inner ring 15 fixed to the rotating shaft 6, second engagement rollers 38 as an example of second engagement members and a retainer 37. The engagement rollers 38 retained by the retainer 37 are disposed at predetermined intervals between an engagement cam-surface 14a as an example of an engagement surface, which is formed on an inner periphery of the second outer ring 14, and an engagement cylindrical surface 15a as an example of an engagement surface, which is formed on an outer periphery of the second inner ring 15, so that the engagement rollers 38 are urged in one direction by coil springs not shown.

The engagement cam-surface 14a of the second outer ring 14, the engagement cylindrical surface 15a of the second inner ring 15, the coil spring, the retainer 37 and the engagement rollers 38 compose a one-way clutch portion 60 of the second one-way clutch 2.

As shown in FIG. 2, the second one-way clutch 2 includes second balls 40 as an example of second rolling members and a retainer 39. The second balls 40 retained by the retainer 39 are circumferentially disposed at predetermined intervals between a raceway surface 14b with a circular arc shape 14b in section, which is formed adjacent the engagement cam-surface 14a of the second outer ring 14, and a raceway surface 15b with a circular arc shape in section, which is formed adjacent the engagement cylindrical surface 15a of the second inner ring 15. The raceway surface 14b of the second outer ring 14, the raceway surface 15b of the second inner ring 15, the retainer 39 and the second balls 40 compose a deep groove ball bearing portion 65.

An outer peripheral diameter on the side of the one-way clutch portion 60 is larger than that on the side of the deep groove ball bearing portion 65 of the second outer ring 14 of the second one-way clutch 2, and an outer peripheral surface of the second outer ring 14 is formed with a tapered surface 14c between the one-way clutch portion 60 and the deep groove ball bearing portion 65.

The outer diameter of the engagement cylindrical surface 15a of the second inner ring 15 of the second one-way clutch 2 is equal to a diameter of a shoulder portion of the raceway surface 15b of the second inner ring 15, and a diameter in a radial direction of the second engagement rollers 38 in section is larger than that of the second balls 40. This means that the diameter of an inscribed circle of the engagement cam-surface 14a of the second outer ring 14 is larger than the outer diameter of the raceway surface 14b of the second outer ring 14. Accordingly, a part 14d on the side of the deep groove ball bearing portion 65 of the second outer ring 14 is located at a position that is more inner in the radial direction than the inscribed circle of the engagement cam-surface 14a.

A curved surface 69 provides a connection between an end surface 81 of the second outer ring 14 in the axial direction on the side of the deep groove ball bearing portion 65 of which the outer peripheral diameter is reduced, and an outer peripheral surface 80 of the deep groove ball bearing portion 65. An end portion on the side of the deep groove ball bearing portion 65 of the second one-way clutch 2 is disposed within the annular recess 67 of the inner peripheral side of the first inner ring 7 of the first one-way clutch 1.

The inner ring 7 of the first one-way clutch 1 is screwed on a thread portion of the rotating shaft 6 so as to be fixed thereto. The second inner ring 15 is clamped and fixed by a bottom surface of the annular recess 67 of the first inner ring 7 and a step portion 6a of the rotating shaft 6. Reference numerals 71, 72, 73 and 74 denote seal members.

In the one-way clutch unit with the above construction, while the engine is in operation, a rotational power of the engine is transmitted to the pulley 3 shown in FIG. 1 via a belt that is not shown. The rotational power transmitted to the pulley 3 is then transmitted to the first outer ring 5 of the first one-way clutch 1 via the first power transmission member 4, so that the first outer ring 5 is rotated. Then, with the first engagement rollers 23 of the one-way clutch portion 50 of the first one-way clutch 1 engaged with the engagement cylindrical surface 5a of the first outer ring 5 and the engagement cam-surface 7a of the first inner ring 7 shown in FIG. 2, the first one-way clutch 1 is brought into an engaged state or on state. Consequently, the rotational power of the engine is transmitted from the first outer ring 5 to the first inner ring 7. Thereafter, the rotational power of the engine transmitted to the first inner ring 7 is transmitted to the rotating shaft 6, so that the compressor that is not shown is driven. While the engine is operating, the rotor 11 of the motor 10 is in a non-operational state, when the second engagement rollers 38 of the second one-way clutch 2 are in a loosely fitted state between the engagement cam-surface 14a of the stationary second outer ring 14 and the engagement cylindrical surface 15a of the second inner ring rotating forward, namely, the second one-way clutch 2 is in a disengaged state or off state.

On the other hand, while the engine is stopped such as at the idling stop, the engine-driven pulley 3 is stopped, and the first engagement rollers 23 are brought into a loosely fitted state between the engagement cylindrical surface 5a of the first outer ring 5 that is stationary and the engagement cam-surface 7a of the first inner ring 7 that is rotating forward, namely, the first one-way clutch 1 is brought into a disengaged state. At this time, the motor 10 is driven to rotate the rotor 11. The rotational power of the rotor 11 is transmitted to the second outer ring 14 of the second one-way clutch 2, so that the second outer ring 14 is rotated in a forward direction. Then, with the second engagement rollers 38 of the one-way clutch portion 60 of the second one-way clutch 2 engaged with the engagement cam-surface 14a of the second outer ring 14 and the engagement cylindrical surface 15a of the second inner ring 15, the second one-way clutch 2 is brought into an engaged state. Consequently, the rotational power is transmitted from the second outer ring 14 to the second inner ring 15. Then, the rotational power of the rotor 11 transmitted to the second inner ring 15 is transmitted to the rotating shaft 6 and drives the compressor. While the individual one-way clutch portions 50, 60 of the first and second one-way clutches 1, 2 are in a disengaged state, the deep groove ball bearing portions 55, 65 of the first and second one-way clutches 1, 2 bear radial loads applied to the one-way clutches 1, 2, respectively, to thereby secure load resistance and durability of their respective one-way clutch portions 50, 60 of the one-way clutches 1, 2.

A power transmission device equipped with the one-way clutch unit of the above embodiment can drive the rotating shaft 6 of the compressor by using the two one-way clutches 1, 2 both while the engine is in operation and while the motor is driven (the engine is stopped). Therefore, unlike he conventional power transmission device, the power transmission device of the above embodiment does not require either electromagnetic clutch or control part for driving the rotating shaft 6 of the compressor. Therefore, the power transmission device can be made small in size and simple in structure.

According to the one-way clutch unit of the above embodiment, the annular recess is formed in the inner periphery of the side of the deep groove ball bearing portion 55 of the first inner ring 7 of the first one-way clutch 1, and the end portion on the side of the deep groove ball bearing portion 65 of the second one-way clutch 2 is disposed in the annular recess 67. Therefore, the dimension in the axial direction of the one-way clutch unit can be reduced by the dimension in the axial direction of the one-way clutch 2 disposed in the annular recess 67. Accordingly, the one-way clutch unit can be made compact.

According to the one-way clutch unit of the above embodiment, the engagement surface of the first outer ring 5 is the engagement cylindrical surface 5a, the engagement surface of the first inner ring 7 is the engagement cam-surface 7a, and the diameter of the shoulder portion of the raceway surface 7b of the first inner ring 7 is set larger than the maximum outer diameter of the engagement cam-surface 7a of the first inner ring 7. Thus, even if the annular recess 67 is formed in the inner periphery of the first inner ring 7, a sufficient thickness on the side of the raceway surface 7b of the first inner ring 7 can be secured, which makes it possible to suppress decrease of the strength, against radial loads, of the side of the deep groove ball bearing portion 55 of the first one-way clutch 1.

According to the one-way clutch unit of the above embodiment, the engagement cam-surface 14a is used as the engagement surface of the second outer ring 14, the engagement cylindrical surface 15a is used as the engagement surface of the second inner ring 15, and the diameter of the shoulder portion of the raceway surface 14b of the second outer ring 14 is set smaller than the minimum inner diameter of the engagement cam-surface 14a of the second outer ring 14. Therefore, the thickness on the side of the raceway surface 14b (the side of the deep groove ball bearing portion 65) of the second outer ring 14 of the second one-way clutch 2 can be made larger than the thickness on the side of the engagement cam-surface 14a. Accordingly, even if the thickness on the side of the raceway surface of the second one-way clutch is set in a manner such that the second one-way clutch 2 is disposed in the recess 67 of the inner periphery of the first inner ring 7 of the first one-way clutch 1, a sufficient thickness can be secured, thus making it possible to suppress deterioration of :he strength, against radial loads, of the second one-way clutch 2 in the one-way clutch unit.

According to the one-way clutch unit of the above embodiment, the curved surface 68 provides the connection between the end surface 79 and the peripheral surface 78 of the annular recess 67 in the inner periphery of the first inner ring 7, and the curved surface 69 provides the connection between the outer peripheral surface 80 and the end surface 81 in the side of the deep groove ball bearing portion 65 of the second cuter ring 14, which is disposed in the annular recess 67 of the first inner ring 7. Thus, even if the second one-way clutch 2 is disposed in the annular recess 67 formed in the inner periphery of the first inner ring 7 of the first one-way clutch 1, and the concave surface 67 of the first one-way clutch 1 is brought into contact with the end surface of the end portion of the second inner ring 15 of the second one-way clutch 2, a stress is not concentrated on the connecting portion between the end surface 79 and the peripheral surface 78 in the annular recess 67 of the first inner ring 7, and the connecting portion between the outer peripheral surface 80 and the end surface 81 in the end portion of the second outer ring 14. Therefore, breakage of these connecting portions can be prevented.

In the one-way clutch unit of the above embodiment, the angular recess 67 is formed in the inner periphery of the side of the deep groove ball bearing portion 55 of the first inner ring 7 of the first one-way clutch 1, and the end portion on the side of the deep groove ball bearing portion 65 of the second one-way clutch 2 is disposed in the annular recess 67. In the one-way clutch unit of the invention, otherwise the annular recess may be formed in the inner periphery of the side of the deep groove ball bearing portion of the first inner ring, and the end portion on the side of the one-way clutch portion of the second one-way clutch may be disposed in the annular recess. Also, in the one-way clutch unit of the invention, otherwise the annular recess may be formed in the inner periphery of the side of the one-way clutch portion of the first inner ring, and the end portion on the side of the deep groove ball bearing portion of the second one-way clutch may be disposed in the annular recess.

In the one-way clutch unit of the above embodiment, the first and second one-way clutches 1, 2 are respectively constructed of the one-way clutch portions 50, 60 and the deep groove ball bearing portions 55, 65. An angular ball bearing portion or a four-point contact ball bearing portion may be adopted in place of at least one of the deep groove ball bearing portions 55, 65.

In the one-way clutch unit of the above embodiment, the engagement rollers 23, 38 are used as the first and second engagement members of the first and second one-way clutches 1, 2. However, at least one of the first and second engagement members may be replaced with a sprag and so on.

As is apparent from the above, since the one-way clutch unit of the present invention comprises the first and second one-way clutches, connection and disconnection of power transmission in two systems can simply be performed.

Furthermore, the one-way clutch unit of one embodiment can allow size reduction, suppress deterioration of the strength and prevent breakage due to a contact between the first and second one-way clutches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch unit comprising:
   a rotating shaft;
   a first one-way clutch comprising:
      a first outer ring having in an inner periphery thereof an engagement surface and a raceway surface which are adjacent to each other;
      a first inner ring contacting the rotating shaft and having in an outer periphery thereof an engagement surface and a raceway surface which are adjacent to each other;

first engagement members disposed between the engagement surface of the first outer ring and the engagement surface of the first inner ring; and first balls disposed between the raceway surface of the first outer ring and the raceway surface of the first inner ring; and a second one-way clutch comprising:

a second outer ring having in an inner periphery thereof an engagement surface and a raceway surface which are adjacent to each other;

a second inner ring having in an outer periphery thereof an engagement surface and a raceway surface which are adjacent to each other;

second engagement members disposed between the engagement surface of the second outer ring and the engagement surface of the second inner ring; and second balls disposed between the raceway surface of the second outer ring and the raceway surface of the second inner ring; wherein an annular recess is provided in an inner periphery of the first inner ring of the first one-way clutch.

2. The one-way clutch unit according to claim 1, wherein the annular recess is provided in the inner periphery of a side of the raceway surface of the first inner ring of the first one-way clutch.

3. The one-way clutch unit according to claim 2, wherein, in the first one-way clutch, the first engagement members are engagement rollers, the engagement surface of the first outer ring is an engagement cylindrical surface, and the engagement surface of the first inner ring is an engagement cam-surface.

4. The one-way clutch unit according to claim 1, wherein an end portion on the side of the raceway surface of the second one-way clutch is disposed in the annular recess.

5. The one-way clutch unit according to claim 4, wherein, in the second one-way clutch, the second engagement members are engagement rollers, the engagement surface of the second outer ring is an engagement cam-surface, and the engagement surface of the second inner ring is an engagement cylindrical surface.

6. The one-way clutch unit according to claim 1, wherein a curved surface connects an end surface and a peripheral surface in the annular recess of the first inner ring; and wherein a curved surface connects an end surface and an outer peripheral surface in an end portion of the second outer ring which is disposed in the annular recess of the first inner ring.

7. The one-way clutch unit according to claim 1, wherein the first inner ring and the second inner ring directly contact the rotating shaft.

8. The one-way clutch unit according to claim 1, wherein the first inner ring is configured to have different diameters relative to a rotational axis of the rotating shaft for defining the cam surface of the first inner ring and the raceway surface of the first inner ring and for providing sufficient thickness of the first inner ring between the annular recess and the raceway surface of the first inner ring.

9. The one-way clutch unit according to claim 1, wherein the first inner ring is configured to have different diameters relative to a rotational axis of the rotating shaft for defining a cam surface of the first inner ring and a raceway surface of the first inner ring and for providing sufficient thickness of the first inner ring between the annular recess and the raceway surface of the first inner ring to provide strength against radial loads.

10. The one-way clutch unit according to claim 1, wherein the engagement surface of the first inner ring is positioned radially further from the rotating shaft than the engagement surface of the second inner ring.

* * * * *